United States Patent
Doll et al.

(10) Patent No.: US 8,359,765 B2
(45) Date of Patent: Jan. 29, 2013

(54) DEVICE AND METHOD FOR DEHYDRATING AND DRYING A MIXTURE OF PLASTIC GRANULES AND WATER

(75) Inventors: Andreas Doll, Aschaffenburg (DE); Reinhardt-Karsten Müerb, Aschaffenburg (DE)

(73) Assignee: Automatik Plastics Machinery GmbH, Grossostheim (DE)

( * ) Notice: Subject to any disclaimer, the term of this patent is extended or adjusted under 35 U.S.C. 154(b) by 662 days.

(21) Appl. No.: 12/594,042

(22) PCT Filed: Apr. 3, 2008

(86) PCT No.: PCT/DE2008/000529
§ 371 (c)(1),
(2), (4) Date: Sep. 30, 2009

(87) PCT Pub. No.: WO2008/122265
PCT Pub. Date: Oct. 16, 2008

(65) Prior Publication Data
US 2010/0126036 A1    May 27, 2010

(30) Foreign Application Priority Data
Apr. 4, 2007   (DE) .................. 10 2007 016 673

(51) Int. Cl.
*F26B 11/00* (2006.01)
(52) U.S. Cl. .................. 34/59; 34/147; 34/166; 34/183; 34/381; 34/497; 416/21 R; 416/244 R; 209/405; 209/409; 464/171; 464/172
(58) Field of Classification Search .......... None
See application file for complete search history.

(56) References Cited

U.S. PATENT DOCUMENTS
(Continued)

FOREIGN PATENT DOCUMENTS
DE    2850584 A1    6/1980
DE    4414753 A1    11/1995
(Continued)

OTHER PUBLICATIONS
"PCT International Search Report dated Aug. 20, 2008 for PCT/DE2008/000529, from which the instant application is based," 3 pgs.
(Continued)

*Primary Examiner* — Stephen M Gravini
(74) *Attorney, Agent, or Firm* — Quarles & Brady LLP

(57) ABSTRACT

The invention relates to a method and a device (01) for dewatering and drying a mixture made of plastic granulate and water, having at least one mixture intake (02), through which the mixture is supplied to the device (01), having at least one water outlet (08), through which the precipitated water is removed from the device (01), having at least one granulate outlet (13), through which the dried granulate is removed from the device (01), the device (01) having a dewatering line (06), along which the mixture is dewatered, and the device (01) having a drying line (12), along which the dewatered granulate is dried. The device (01) comprises at least one sensor (16), using which at least one property parameter of the granulate, in particular the temperature and/or residual moisture of the dried granulate, may be measured directly or indirectly, the device (01) comprising at least one final control element (17), and the property parameter monitored using the sensor (16), in particular the temperature and/or residual moisture of the dried granulate, being able to be influenced as a function of the measured values of the sensor (16) using the final control element (17).

28 Claims, 1 Drawing Sheet

U.S. PATENT DOCUMENTS

| | | | | |
|---|---|---|---|---|
| 2,816,372 | A * | 12/1957 | Myers et al. | 34/216 |
| 3,469,329 | A * | 9/1969 | Unger | 34/137 |
| 3,483,594 | A | 12/1969 | Hewitt | |
| 3,742,614 | A * | 7/1973 | Bettermann et al. | 34/147 |
| 4,030,205 | A | 6/1977 | Robertson et al. | |
| 4,870,760 | A * | 10/1989 | Graff | 34/473 |
| 5,330,340 | A | 7/1994 | Suppon et al. | |
| 5,566,468 | A * | 10/1996 | Graeff | 34/80 |
| 5,697,168 | A * | 12/1997 | Matthys et al. | 34/137 |
| 6,119,365 | A * | 9/2000 | Wuller et al. | 34/218 |
| 6,438,866 | B1 | 8/2002 | Meydell et al. | |
| 6,584,699 | B2 * | 7/2003 | Ronning et al. | 34/134 |
| 6,938,357 | B2 * | 9/2005 | Hauch | 34/168 |
| 7,987,613 | B2 * | 8/2011 | Ness et al. | 34/138 |
| 2002/0184787 | A1 * | 12/2002 | Ronning et al. | 34/134 |
| 2006/0121142 | A1 | 6/2006 | Pinchot | |
| 2009/0094853 | A1 * | 4/2009 | Noyes et al. | 34/233 |
| 2010/0126036 | A1 * | 5/2010 | Doll et al. | 34/328 |

FOREIGN PATENT DOCUMENTS

| | | |
|---|---|---|
| DE | 69318829 T2 | 12/1998 |
| DE | 19931222 A1 | 1/2001 |
| DE | 10302645 A1 | 7/2004 |
| DE | 102004011325 A1 | 9/2004 |
| DE | 10352106 A1 | 6/2005 |
| DE | 102004004680 A1 | 10/2005 |
| DE | 102004053929 A1 | 5/2006 |
| DE | 102005004533 A1 | 8/2006 |
| EP | 0632758 A1 | 1/1995 |
| EP | 0814311 A | 12/1997 |
| EP | 0632758 BI | 5/1998 |
| EP | 0972622 A1 | 1/2000 |
| JP | 04197710 A | 7/1992 |
| JP | 05172463 A | 7/1993 |
| JP | 6218726 A | 8/1994 |
| JP | 08207044 A | 8/1996 |
| JP | 10089846 A | 4/1998 |
| JP | 2003050087 A | 2/2003 |
| WO | 9318897 A1 | 9/1993 |
| WO | 2005051623 A1 | 6/2005 |

OTHER PUBLICATIONS

"PCT International Search Report dated Aug. 18, 2008 for PCT/DE2008/000530," 2 pgs.

"PCT International Preliminary Report on Patentability dated Nov. 10, 2009 for PCT/DE2008/000529, from which the instant application is based," 10 pgs.

Japan Patent Office, Notification of Reason(s) for Refusal, Application No. 2010-501368, Jul. 10, 2012.

* cited by examiner

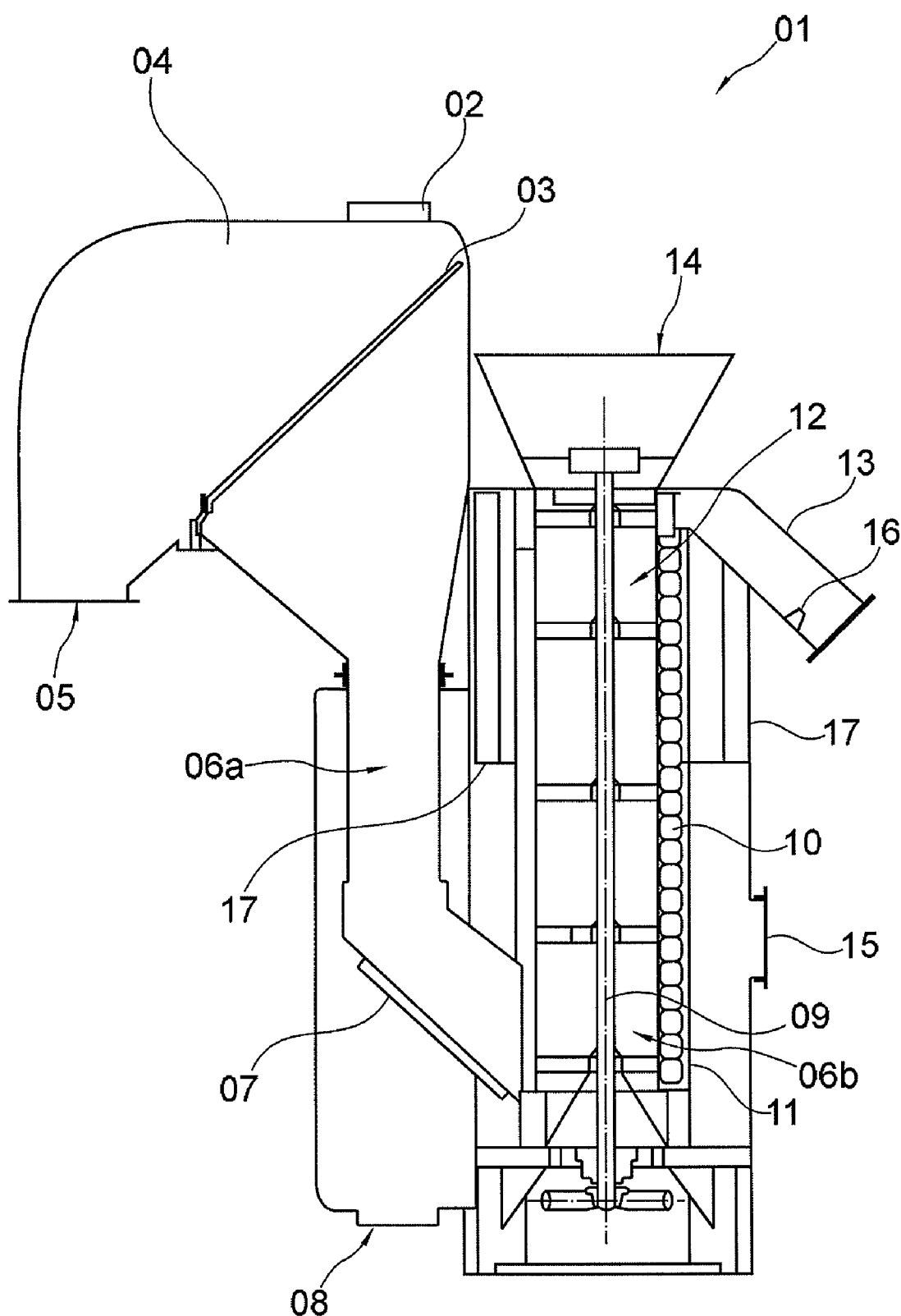

DEVICE AND METHOD FOR DEHYDRATING AND DRYING A MIXTURE OF PLASTIC GRANULES AND WATER

RELATED APPLICATIONS

This application is a 35 U.S.C. 371 national stage filing from International Application No. PCT/DE2008/000529 filed Apr. 3, 2008, which claims priority to German Patent Application No. 10 2007 016 673.9, filed Apr. 4, 2007, the teachings of which are incorporated herein by reference.

The invention relates to a device for dewatering and drying a mixture made of plastic granulate and water according to the preamble of claim 1. Furthermore, the invention relates to a method for dewatering and drying a mixture made of plastic granulate and water.

Polymer raw materials are typically packaged and delivered to the customer in granulate form. Granulating plants are used to bring a polymer raw material produced in a polymer reactor or in a compounding plant into granulate form. The plastic granulate is typically cooled using water in these granulating plants. Before the further processing of the plastic granulate, the cooling water must then be separated from the plastic granulate again, for which devices and methods of the generic type may be used. A device of the generic type for dewatering and drying a mixture made of plastic granulate and water is known, for example, from U.S. Pat. No. 6,438,866 B1.

DE 10 2004 011 325 A1 describes a facility for drying plastic granulate. Firstly, water is extracted in a centrifugal dewatering unit and subsequently the granulate is dried in an air stream in a downstream surface dryer.

A complex thermodynamic equilibrium results during the dewatering and drying of the plastic granulate. This is because after the separation of the water from the granulate, up to 10 wt.-% water adheres to the granulate grains. This water vaporizes in the drying line due to the heat present in the granulate, by which the plastic granulate is cooled further. In addition, the water mist arising in the device dissipates its heat to the housing of the device and condenses, by which a cooling effect also arises. The property parameters of the plastic granulate, in particular the temperature and the residual moisture of the plastic granulate, are thus a function of a complex thermodynamic equilibrium in the known devices. Predefined target parameters, for example, a predetermined final temperature of the granulate, may therefore only be maintained with difficulty in many cases. However, not maintaining specific target parameters is a great disadvantage for specific polymer materials. For example, if the granulate is cooled to too low a temperature in the dryer, this may interfere with downstream processing steps, such as the crystallization of the plastic granulate. In contrast, if the final temperature is too high, in many plastics the plastic granulate has a tendency to stick together and thus result in disturbances in the conveyance flow or cause clumping during the storage of the granulate.

Proceeding from this prior art, it is therefore the object of the present invention to suggest a novel device for dewatering and drying a mixture made of plastic granulate and water, which allows targeted monitoring and control of specific property parameters. Furthermore, it is an object of the present invention to suggest a corresponding drying method.

This object is achieved by a device and a method according to the teaching of the two independent main claims.

Advantageous embodiments of the invention are the subject matter of the subclaims.

The invention is based on the main idea that a sensor is provided in the device, using which at least one property parameter of the granulate, in particular the temperature and/or the residual moisture of the dried granulate or the drying air, may be measured directly or indirectly. This measured property parameter is then a reference variable, as a function of which a final control element provided in the device is set. The final control element is implemented in such a manner that the property parameter monitored using the sensor, such as the temperature or residual moisture of the dried granulate, may be influenced as a function of the measured actual values. As a result, a control mechanism is thus implemented, using which at least one property parameter of the granulate may be monitored in regard to maintaining specific presets. In the event of impermissible deviations of the property parameter from desired presets, for example, if the temperature of the dried granulate is too high or too low, the property parameter may be influenced in such a manner by a control intervention of the final control unit that the deviation is reduced.

The manner in which the final control element is adjusted to influence the monitored property parameter as a function of the measured values acquired using the sensor is fundamentally arbitrary. According to a first preferred embodiment, a control unit is provided for this purpose in the device to construct a control system in this manner. The measured actual value of the monitored property parameter is compared by the control unit to a predefined setpoint value in the control system. The control unit then generates a control signal corresponding to the control strategy stored in the control unit as a function of the control difference between the actual value and the predefined setpoint value. The final control element is activated using this control signal and in this manner the monitored property parameter is influenced by the final control element in such a manner that the control difference is decreased.

As an alternative to implementing a control system in the device, the device may also be equipped with a regulating unit, to implement a regulating circuit for regulating the monitored property parameter in this manner. The actual value measured using the sensor is compared to a setpoint value stored in the regulating unit in this regulating circuit and a regulating signal for activating the final control element is generated as a function of the resulting regulating difference. This regulating signal is capable, in accordance with the predefined regulating strategy, of decreasing the regulating difference and influencing the actual value in the direction of the setpoint value.

A further form of implementation of the final control element for influencing the monitored property parameter is to provide a heating or cooling element in the device, using which the dried granulate may be directly or indirectly heated and/or cooled. Heat energy may thus be supplied to or withdrawn from the dried granulate in this manner, by which the temperature and/or the residual moisture of the dried granulate may be influenced in particular.

A heat exchanger may be provided in the device for the constructive implementation of the heating or cooling element. Said heat exchanger has liquid or gaseous heating or cooling medium flowing through it, for example, temperature-controlled air or temperature-controlled water or temperature-controlled oil, to control the temperature of the surrounding area of the heat exchanger, which the plastic granulate flows past, for example, appropriately in this manner.

The heat exchanger may be implemented especially simply and cost-efficiently and still effectively in that a housing part of the device has a double-walled section. In particular the exterior wall of the drying line and/or the wall of the granulate outlet may be implemented in this manner as a double-walled heat exchanger.

To increase the effective heat transfer between the heat exchanger on the one hand and the area to be temperature-controlled on the other hand, the heat exchanger may additionally be equipped with attached elements, such as lamellae, to enlarge the heat exchanger surface.

Alternatively or additionally to using heat exchangers, heating or cooling elements which are electrically heated or cooled may also be used.

Final control elements which are implemented like humidifier units may also be used as a further alternative for influencing the monitored property parameter. Using the humidifier unit, a medium, in particular water, may be supplied either to the dried granulate or the water vapor discharged from the granulate or a component of the device for humidifying and/or for temperature control. If the granulate is humidified, stronger evaporative cooling is caused by the increase of the degree of moisture and thus residual moisture and the temperature of the granulate are influenced in the desired manner. If the water vapor discharged from the granulate is humidified, the water vapor may condense more strongly and thus exert a correspondingly altered cooling effect on the housing of the device. With many plastics, such as PET or polyamides, the crystallization behavior may be influenced in a targeted manner by a controlled water vapor atmosphere. In addition, direct cooling and/or heating of a component of the device is possible through direct humidification of this component of the device, in particular the granulate outlet, to control the temperature of the component in the desired manner in this way.

A spray nozzle may be provided in the device for the constructive implementation of a humidifier unit. According to a first type of use of this spray nozzle, water is thus sprayed into the device for mist precipitation.

As an alternative to spraying in water for mist precipitation, water may also be sprayed externally onto the granulate outlet for cooling using the spray nozzle, to avoid adhesion of hot granulate to the internal surface of the granulate outlet and clogs accompanying it.

To improve the temperature-control action on the component to be temperature-controlled using the humidifier unit, in particular in the area of the granulate outlet, attached elements may be provided on this component, for example, lamellae to enlarge the surface.

The point at which the monitored property parameter is measured using the sensor is fundamentally arbitrary. To obtain especially high processing reliability, in particular for downstream processing steps, however, it is especially advantageous if the sensor is either situated along the drying line or at the end of or after the drying line, in particular in the granulate outlet. In this way, the property parameter, such as the granulate temperature, may particularly be measured shortly before or when the granulate leaves the device. The temperature and/or residual moisture of the drying air is preferably measured at a point before or after a ventilator and/or before or after a condensation precipitator.

The positioning of the final control element in the device is also fundamentally arbitrary. To avoid reaction times between control intervention and desired change of the property parameter which are too long, it is also preferable here for the final control element to be situated along the drying line or at the end of the drying line or after the drying line, in particular in the area of the granulate outlet.

To support the drying of the granulate in the drying line by vaporization of the water adhering to the plastic granulate, the device may have an additional supply of dry air along the drying line. For this purpose, the drying line has a least one air inlet, through which drying air may be blown in to dry the granulate, and at least one air outlet, through which the drying air may flow out again. As the drying air flows past the granulate grains, water adhering thereto is vaporized. The plastic granulate is additionally cooled and dried in this way.

A particularly high cooling and drying action results if the drying air flows against the granulate in the drying line opposite to the conveyance direction of the granulate.

One embodiment for the concrete implementation of a final control element, using which a property parameter of the plastic granulate, namely the temperature and/or the residual moisture of the plastic granulate, may be influenced consists in that the drying air may be heated and/or cooled and/or dehumidified and/or humidified. This is because the effect of the evaporative cooling is strengthened or weakened depending on the temperature and/or humidity of the drying air, which has a direct influence on the temperature and/or the residual moisture of the dried granulate.

In the devices of the generic type, a dewatering line is provided, along which the water is initially separated, for example, by transverse flow filtration, after introduction of the mixture made of plastic granulate and water. There are manifold possibilities for the constructive implementation of dewatering lines of this type. According to a preferred embodiment, the dewatering line has two sections. In the first section of the dewatering line, the granulate is first separated from the water by the effect of gravity. In the adjoining second section of the dewatering line, the separation of water and granulate is performed by centrifugal force action.

To be able to implement the separation of water and granulate in the first section of the dewatering line, a first retention element, such as a perforated plate or a screen or a slotted hole screen may be used. The retention element is situated in such a manner that the mixture made of water and granulate, which is accelerated by gravity, falls onto the retention element, the granulate particles being retained, while in contrast the liquid water may pass through the retention element due to gravity. A first coarse separation of water and granulate is implemented and a large proportion of the water contained in the mixture is already removed in this manner.

A retention element, which may again be implemented like a perforated plate or like a screen or slotted hole screen, may also be provided in the second section of the dewatering line. The separation of water and granulate occurs in this case through centrifugal force acceleration. The mixture made of water and granulate accelerated by the centrifugal force is thrown against the retention element, the granulate particles being retained, while in contrast the water passes through the retention element. The water may be separated enough by this centrifugal dewatering that only residual moisture still adheres to the granulate particles. This residual moisture is then removed in the adjoining drying line of the device.

According to a preferred embodiment of the invention, a conveyance unit, in particular a rotor having rotor blades, is provided in the second section of the dewatering line and/or in the drying line, using which the granulate may be conveyed in the direction of the granulate outlet.

The method according to the invention is distinguished in that in a first step, the property parameter to be monitored is measured directly or indirectly using a sensor, and subsequently the property parameter is influenced as a function of the measured value using the final control element.

When the method according to the present invention is used, it is particularly advantageous if the monitored property parameter is controlled in a control system or regulated using a regulating circuit.

The type of material which is dewatered and dried using the method according to the invention is fundamentally arbitrary. The method according to the invention is of especially great significance for PET material, because this material tends to stick together in particular at temperatures which are too high, and temperatures which are too low may interfere with downstream processing steps, in particular the crystallization of the PET granulate.

The method according to the invention assumes a special position in the direct crystallization of PET, in particular CC-PET. For this purpose, the PET granulate is preferably temperature-controlled to a temperature between 140° C. and 170° C., in particular to a temperature between 150° C. and 160° C.

An embodiment of the invention is schematically illustrated in the drawing and is explained for exemplary purposes in the following.

FIG. 1 shows a device for dewatering and drying a mixture made of plastic granulate and water in schematic cross-section.

FIG. 1 shows a device 01 for dewatering and drying a mixture made of plastic granulate and water in cross-section. The mixture made of plastic granulate and water, as it comes from an upstream granulating plant, for example, is introduced into the device 01 at a mixture intake 02. Firstly agglomerates 04 are screened out at a screen 03 and removed laterally from the device 01 through an agglomerate outlet 05. The now agglomerate-free mixture made of water and plastic granulate is subsequently accelerated by gravity along a first section 06a of a dewatering line 06 and falls on a perforated plate 07. The plastic granulate particles are retained on the perforated plate 07 and conveyed laterally into a second section 06b of the dewatering line 06. In contrast, the water accelerated by gravity largely passes through the perforated plate 07 and is removed from the device 01 through a water outlet 08.

In the second section 06b of the dewatering line 06, the plastic granulate and the still remaining water are rotationally accelerated using a rotor 09 and rotor blades 10 fastened thereto, so that the mixture made of plastic granulate and remaining water is accelerated outward by centrifugal force. The rotor 09 having the rotor blades 10 cylindrically encloses a perforated plate 11, at which the granulate particles accelerated by centrifugal force are retained. The water accelerated by the centrifugal force, in contrast, passes through the perforated plate 11 and also drains downward through the water outlet 08.

A drying line 12 adjoins the second section 06b of the dewatering line 06, along which the water still adhering to the plastic granulate particles is dried by vaporization. The rotor 09 having the rotor blades 10, which conveys the granulate particles upward along the inside of the perforated plate 11, is again used for conveying the plastic granulate particles along the drying line 12 in the direction of the granulate outlet 13. To increase the drying effect on the granulate particles along the drying line 12, drying air is supplied through the granulate outlet 13 and an air inlet 14, so that the drying air flows opposite to the plastic granulate along the drying line 12. The drying air is suctioned off at the end of the drying line 12 through an air outlet 15.

A sensor 16 is provided at the granulate outlet 13, using which two property parameters of the granulate dried in the device 01, namely the temperature and/or the residual moisture of the dried granulate, may be determined. The measured values of the sensor 16 are transmitted to the controller of the device 01 via data lines (not shown). A regulating unit is integrated in the controller, which compares the measured actual values of the sensor 16 to predefined setpoint values. If the regulating unit establishes a regulating difference, the temperature preset of a heat exchanger 17, which has temperature-controlled water flowing through it, is activated in such a manner that the temperature and/or the residual moisture of the granulate are influenced along the final section of the drying line 12 in such a manner that the desired setpoint values are again reached at the granulate outlet 13. As a result, a regulating circuit is thus implemented to regulate the temperature and the residual moisture content of the plastic granulate at the granulate outlet 13.

The heat exchanger 17 is constructively formed by a double-walled housing section at the end of the drying line 12. This double-walled housing section has temperature-controlled water flowing through it, to supply heat energy to and/or withdraw heat energy from the granulate in this manner.

Alternatively or additionally to the heat exchanger 17, a double-walled housing section may also be provided on the granulate outlet 13 to control the temperature of the granulate outlet 13. A temperature control of the granulate outlet 13 by spraying with temperature-controlled water is also possible.

A further possibility for influencing the temperature and/or the residual moisture content is for the drying air flowing in through the air inlet 14 to be temperature-controlled in a targeted manner.

The invention claimed is:

1. A device for dewatering and drying a mixture comprising plastic granulate and water, said device comprising:
    at least one mixture intake supplying a mixture of plastic granulate and water to the device;
    at least one water outlet removing precipitated water from the device;
    at least one granulate outlet removing dried granulate from the device;
    a dewatering line dewatering the mixture;
    a drying line drying dewatered granulate;
    at least one sensor measuring measured values of the sensor, said measured values of the sensor being actual values of at least one property parameter of the granulate including at least one of temperature and residual moisture of the dried granulate; and
    at least one final control element controlling the at least one property parameter as a function of the measured values of the sensor.

2. The device according to claim 1, wherein the device comprises a control unit, the actual values measured using the sensor being compared to a predefined setpoint value, and the control unit generating a control signal for activating the final control element as a function of the control difference between actual values and setpoint value.

3. The device according to claim 1, wherein the device comprises a regulating unit, the actual values measured using the sensor being compared to a predefined setpoint value, and the regulating unit generating a regulating signal for activating the final control element as a function of the regulating difference between actual values and setpoint value.

4. The device according to claim 1, wherein the final control element is at least one of a heating and cooling element, wherein the dried granulate is at least one of heated and cooled directly or indirectly.

5. The device according to claim 4, wherein the at least one of a heating and cooling element is a heat exchanger having at least one of a liquid heating medium, liquid cooling medium, gaseous heating medium, and gaseous cooling medium flowing through it, the medium selected from the group consisting of water, air, oil, and combinations thereof.

6. The device according to claim 5, wherein the heat exchanger is formed by a double-walled section of a housing part of the device, the double walled section including at least one of an exterior wall of the drying line and a wall of the granulate outlet.

7. The device according to claim 5, wherein the heat exchanger has attached elements including a lamellae to enlarge a heat exchanger surface.

8. The device according to claim 4, wherein the at least one of a heating and cooling element is electrically heated and/or cooled.

9. The device according to claim 1, wherein the final control element is a humidifier unit using a humidifying medium that may be supplied to at least one of the dried granulate, water vapor discharged from the granulate, and a component of the device for at least one of humidification and temperature control.

10. The device according to claim 9, wherein the humidifier unit includes a spray nozzle spraying water into the device for mist precipitation.

11. The device according to claim 9, wherein the humidifier unit includes a spray nozzle spraying water onto the granulate outlet for cooling.

12. The device according to claim 9, wherein the component which may be temperature-controlled using the humidifier unit has attached elements for enlarging a heat exchanger surface.

13. The device according to claim 1, wherein the sensor for measuring the property parameter is situated along the drying line.

14. The device according to claim 1, wherein the sensor for measuring the property parameter is situated at the end of or after the drying line and in or on the granulate outlet.

15. The device according to claim 1, wherein the final control element for influencing the property parameter is situated along the drying line.

16. The device according to claim 1, wherein the final control element for influencing the property parameter is situated at the end of or after the drying line and in the granulate outlet.

17. The device according to claim 1, wherein the drying line has an air inlet, through which drying air may be blown in to dry the granulate, and an air outlet, through which the drying air may flow out again.

18. The device according to claim 17, wherein the drying air flows opposite to the conveyance direction of the granulate in the drying line.

19. The device according to claim 17, wherein the final control element is implemented so that the drying air may be heated and/or cooled and/or dehumidified and/or humidified.

20. The device according to claim 1, wherein the dewatering line has a first section and a second section, the water being separated from the granulate by gravity action in the first section, and the remaining water being separated from the granulate by centrifugal force action in the second section.

21. The device according to claim 20, wherein the first section of the dewatering line has a first retention element including a perforated plate, at which the granulate particles accelerated by gravity are retained, while in contrast the water accelerated by gravity may drain off.

22. The device according to claim 20, wherein the second section of the dewatering line has a second retention element including a perforated plate, at which the granulate particles accelerated by centrifugal force are retained, while in contrast the water accelerated by centrifugal force may drain off.

23. The device according to claim 20, wherein a conveyor unit including a rotor having rotor blades conveys the granulate in the direction of the granulate outlet and is provided in the second section of the dewatering line and/or in the drying line.

24. A method for operating a device capable of dewatering and drying a mixture comprising:
providing a dewatering and drying device comprising at least one mixture intake, through which the mixture is supplied to the device, at least one water outlet, through which the precipitated water is removed from the device, at least one granulate outlet, through which dried granulate is removed from the device, a dewatering line, along which the mixture is dewatered, and a drying line, along which dewatered granulate is dried to form the dried granulate;
measuring at least one property parameter of the dried granulate, said at least one property parameter being a measured value selected from a group consisting of temperature and residual moisture of the dried granulate; and
activating a final control element to influence the at least one property parameter of the granulate as a function of the measured values.

25. The method according to claim 24, wherein the at least one property parameter is controlled using a control unit or regulated using a regulating unit as a function of the measured values.

26. The method according to claim 24, wherein the dried granulate predominately comprises PET.

27. The method according to claim 24, wherein the at least one property parameter is a temperature of the dried granulate, and the temperature of the dried granulate is controlled to a temperature between 140° C. and 170° C.

28. The method according to claim 27, wherein the dried granulate is temperature-controlled to a temperature between 150° C. and 160° C.

* * * * *

UNITED STATES PATENT AND TRADEMARK OFFICE
CERTIFICATE OF CORRECTION

PATENT NO. : 8,359,765 B2
APPLICATION NO. : 12/594042
DATED : January 29, 2013
INVENTOR(S) : Andreas Doll et al.

It is certified that error appears in the above-identified patent and that said Letters Patent is hereby corrected as shown below:

Column 8, Claim 24, line 39 "values" should be changed to -- value --

Column 8, Claim 25, line 43 "values" should be changed to -- value --

Signed and Sealed this
Second Day of April, 2013

Teresa Stanek Rea
*Acting Director of the United States Patent and Trademark Office*